US008931942B2

(12) United States Patent
Bria et al.

(10) Patent No.: US 8,931,942 B2
(45) Date of Patent: *Jan. 13, 2015

(54) LED-BASED DENTAL EXAM LAMP

(71) Applicant: Dental Equipment, LLC, Charlotte, NC (US)

(72) Inventors: Joe Bria, Waxhaw, NC (US); H. Thomas Lockamy, Charlotte, NC (US); Robert St. Louis, Charlotte, NC (US); John Helgesen, Rock Hill, SC (US); Nabil Dagher, Waxhaw, NC (US); Ted Von Badinski, Indian Trail, NC (US); Tom Benfield, York, SC (US); Austin Unsworth, Fort Mill, SC (US); Nathan Hemmer, Newberg, OR (US)

(73) Assignee: Dental Equipment, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,857

(22) Filed: May 30, 2013

(65) Prior Publication Data

US 2013/0343080 A1    Dec. 26, 2013

Related U.S. Application Data

(63) Continuation of application No. 12/693,904, filed on Jan. 26, 2010, now Pat. No. 8,459,852, which is a continuation-in-part of application No. 12/287,481, filed on Oct. 8, 2008, now Pat. No. 8,016,470, which is (Continued)

(51) Int. Cl.
*F21K 99/00* (2010.01)
*F21V 23/04* (2006.01)

(Continued)

(52) U.S. Cl.
CPC . *F21K 9/50* (2013.01); *F21V 11/10* (2013.01); *F21V 23/0457* (2013.01);

(Continued)

(58) Field of Classification Search
USPC ........... 362/572, 573, 804, 231, 294, 373, 33, 362/580, 296.01, 296.06, 800; 433/29–31
See application file for complete search history.

(56) References Cited

U.S. PATENT DOCUMENTS 4,608,622 A    8/1986    Gonser
6,290,368 B1 *  9/2001    Lehrer .......................... 362/187

(Continued)

FOREIGN PATENT DOCUMENTS

DE    102006004995 A1    10/2006
EP    1741975 A2    10/2007

(Continued)

OTHER PUBLICATIONS

Walsh, Laurence J., LED operating lights in dental practice, Australasian Dental Practice, May/Jun. 2009, pp. 48-54.

*Primary Examiner* — Bao Q Truong
(74) *Attorney, Agent, or Firm* — Timothy H. Van Dyke; Beusse, Wolter, Sanks & Maire, P.A.

(57) ABSTRACT

Disclosed herein is an improved dental operatory lamp having an LED light source that directs light to a reflector that in turn reflects the light to illuminate a treatment area. In one embodiment, the lamp is adapted for efficient transfer of heat from the light source and into the environment. In another embodiment, the lamp is adapted to generate a predetermined pattern of light optimal for the treatment area. In other embodiments, the lamp includes structural features that enable the lamp to maintain optimum light intensity and/or temperature. Also, disclosed herein are unique reflector embodiments that intentionally provide a generally smooth surface, without facets, that reflect light at all visible and infrared wavelengths.

12 Claims, 9 Drawing Sheets

Related U.S. Application Data a continuation-in-part of application No. 11/867,876, filed on Oct. 5, 2007, now abandoned, which is a continuation-in-part of application No. 11/120,170, filed on May 2, 2005, now Pat. No. 7,425,077.

(51) Int. Cl.

| | |
|---|---|
| *F21V 29/00* | (2006.01) |
| *F21V 8/00* | (2006.01) |
| *F21S 8/10* | (2006.01) |
| *F21V 29/02* | (2006.01) |
| *F21V 7/22* | (2006.01) |
| *F21V 11/10* | (2006.01) |
| *F21V 14/00* | (2006.01) |
| *F21W 131/202* | (2006.01) |
| *F21W 131/205* | (2006.01) |
| *F21Y 101/02* | (2006.01) |
| *F21V 7/00* | (2006.01) |
| *F21V 25/10* | (2006.01) |

(52) U.S. Cl.
CPC ............ *F21V 23/04* (2013.01); *F21V 29/2212* (2013.01); *F21V 29/2293* (2013.01); *F21V 14/003* (2013.01); *F21V 23/0442* (2013.01); *F21V 29/006* (2013.01); *G02B 6/0008* (2013.01); *F21S 48/328* (2013.01); *F21K 9/52* (2013.01); *F21W 2131/202* (2013.01); *F21V 29/02* (2013.01); *F21S 48/1394* (2013.01); *F21V 29/004* (2013.01); *F21V 7/22* (2013.01); *F21W 2131/205* (2013.01); *F21Y 2101/02* (2013.01); *F21V 7/0008* (2013.01); *F21V 25/10* (2013.01)
USPC .......................... 362/573; 362/555; 362/294

(56) References Cited

U.S. PATENT DOCUMENTS

| | | | |
|---|---|---|---|
| 6,692,252 | B2 | 2/2004 | Scott |
| 6,955,444 | B2 * | 10/2005 | Gupta ........................... 362/105 |
| 7,425,077 | B2 * | 9/2008 | Lockamy et al. ............... 362/33 |
| 7,777,955 | B2 | 8/2010 | Cassarly et al. |
| 7,959,338 | B2 | 6/2011 | Kazakevich |
| 8,016,470 | B2 | 9/2011 | Li et al. |
| 8,388,205 | B2 * | 3/2013 | Swayne et al. ................. 362/573 |
| 2001/0046652 | A1 | 11/2001 | Ostler et al. |
| 2003/0215766 | A1 | 11/2003 | Fischer et al. |
| 2004/0029069 | A1 | 2/2004 | Gill et al. |
| 2006/0002135 | A1 | 1/2006 | Kokeny et al. |
| 2006/0245173 | A1 | 11/2006 | Lockamy et al. |
| 2007/0024971 | A1 | 2/2007 | Cassarly et al. |
| 2007/0031777 | A1 | 2/2007 | Wang et al. |
| 2008/0002402 | A1 | 1/2008 | Mandikos |
| 2008/0025013 | A1 * | 1/2008 | Lockamy et al. ............... 362/33 |
| 2009/0091913 | A1 | 4/2009 | Li et al. |

FOREIGN PATENT DOCUMENTS

| | | |
|---|---|---|
| JP | 4187414 B2 | 11/2008 |
| WO | 2000067048 A2 | 9/2000 |

* cited by examiner

LED-BASED DENTAL EXAM LAMP

RELATED U.S. APPLICATION DATA

This application is a continuation of U.S. application Ser. No. 12/693,904, filed Jan. 26, 2010, now U.S. Pat. No. 8,459,852, which is a continuation-in-part of U.S. application Ser. No. 12/287,481, filed Oct. 8, 2008, published as Pub. No. US 2009/0091913, now U.S. Pat. No. 8,016,470 which is a continuation in part of U.S. application Ser. No. 11/867,876, filed Oct. 5, 2007, published as Pub. No. US 2008/0025013 A1 on Jan. 31, 2008, which is a continuation-in-part of application Ser. No. 11/120,170, filed on May 2, 2005, now U.S. Pat. No. 7,425,077. Priority to these applications is claimed under 35 USC 120 and the disclosures of such are hereby incorporated herein by reference in their entirety.

TECHNICAL FIELD

This invention relates to an operatory lamp for illuminating a treatment area, and more particularly to a lamp that includes technological features that makes it uniquely well suited for use by a dentist or dental assistant in a dental operatory setting.

BACKGROUND

It has been known for an extended period of time that electricity may be harnessed to create visible light. Incandescent light emitting elements powered by electricity have been used for substantially the same period of time. However, such incandescent lights suffer from an inefficient conversion of electricity to visible light. The inefficient conversion process causes production of a considerable amount of heat, and emission of a significant amount of radiation in, or near, the infrared spectrum. Such infrared emission inherently casts a heat load onto a target along with an illuminating beam. The heat generated by incandescent lighting may sometimes place an undesirable burden on environmental control systems, such as cooling systems used in dwellings. Both the inefficient conversion process, and removing the undesired heat load from the area near the light, lead to a correspondingly larger than necessary electric utility bill. Furthermore, in use on an operatory to illuminate an operating site on a patient, the infrared emissions may undesirably dry illuminated tissue, or may produce a feeling of discomfort in the patient.

Alternative light emitting elements include fluorescent light bulbs. Such fluorescent bulbs advantageously produce a reduced heat load compared to incandescent bulbs. However, fluorescent bulbs tend to be bulky, and generally produce light of a less desirable color and intensity for many applications. Furthermore, certain electrical components required in the electric circuit powering the fluorescent bulbs, such as the ballast, tend to produce an undesirable amount of noise. In use in an operatory, it is generally desired to reduce the bulk of a lamp fixture, to reduce its intrusion into the operating arena, and to facilitate ease of manipulation of the lamp fixture.

The majority of currently marketed dental exam lights use incandescent bulbs as light sources. These incandescent dental exam lights possess a number of disadvantages, such as: emission of infra-red (IR) radiation that must be removed with filters or so-called 'cold-mirrors' to prevent excessive warming of the patient and user; relatively short bulb lifetime; inability of the user to adjust light color temperature and chromaticity of light; color temperature becoming lower and the light becoming "warmer" (i.e., shifting from white to orange/red), when light intensity is reduced (dimmed); and production of significant ultraviolet (UV) and blue light which causes undesired and uncontrolled curing of dental composites and adhesives.

BRIEF SUMMARY OF THE INVENTION

The inventors have surmised that it would be desirous to provide a more energy-efficient lamp fixture capable of producing a reduced heat load, and casting illumination having a desirable color and intensity that can be adjusted to obtain desirable spectra in a single lamp. Accordingly, in one embodiment, the invention pertains to an operatory lamp used to illuminate a treatment area for treating a patient that includes structural features to efficient transfer heat from a light source and into the environment. The lamp is adapted to be movably mounted at a predetermined position above the treatment area to facilitate a doctor in treating the patient. The lamp includes a housing having a front portion toward the treatment area and a rear portion away from the treatment area. The front portion of the housing includes an elongate support member extending across a generally central axis of the housing. An LED light source is mounted on the support member generally at the central axis of the housing for generating and projecting light rearward away from the treatment area, with the LED light source having a base toward the treatment area and a lens away from the treatment area. A reflector is included at the rear portion of the housing and is illuminated by light from the LED light source. The reflector reflects the light in a beam past the support member generally parallel to the central axis of the housing toward the treatment area for illuminating the treatment area. The housing also includes a heat sink spaced apart from the beam of light from the reflector toward the treatment area so as not to obstruct the beam of light in illuminating the treatment area; and a heat transfer conduit extending from adjacent to the LED light source along the support member to the heat sink for conducting heat generated at the LED light source to the heat sink for dissipation of the heat away from the LED light source.

In a particular embodiment, the heat transfer conduit is a heat pipe. In another embodiment, the heat transfer conduit is formed of a generally solid rod of material having a high coefficient of heat transfer. Furthermore, the heat sink may be positioned at the rear portion of the housing. In a more specific embodiment, the heat sink includes a plurality of channels for directing ambient air flow past the heat sink.

In another embodiment, the heat transfer conduit is a hollow tube for conducting a flow of cooling air past the LED light source for absorbing heat generated at the LED light source and directing heated air to the heat sink, with the heat sink exhausting air to the environment. The embodiment may further include a fan in fluid communication with the hollow tube for moving cooling air through the tube.

In another embodiment, the support member extends from a side of the housing to the central axis of the housing. In a more specific embodiment, the support member extends from one side of the housing to the other side of the housing, and the LED light source is positioned generally at the center of the support member.

The inventors have also realized that the efficiency of lighting from a dental lamp may be increased by controlling the shape of light output that is in turn reflected to the patient. According to another embodiment, the invention pertains to an operatory light used to illuminate a treatment area for treating a patient that includes a strategically placed light guide to direct light according to a predetermined shape and pattern. The lamp is adapted to be movably mounted at a predetermined position above the treatment area to facilitate a doctor in treating the patient. The lamp includes a housing having a front portion toward the treatment area and a rear portion away from the treatment area. The front portion of the housing includes an elongate support member extending across a generally central axis of the housing. An LED light source is mounted on the support member generally at the central axis of the housing for generating and projecting light rearward away from the treatment area, with the LED light source having a base toward the treatment area and a lens away from the treatment area. A reflector is included at the rear portion of the housing and is illuminated by light from the LED light source. The reflector reflects the light in a beam past the support member generally parallel to the central axis of the housing toward the treatment area for illuminating the treatment area. The embodiment further includes a light guide positioned between the LED light source and the reflector for directing the light in a beam from the light source to the reflector having a generally transparent portion with a cross-sectional size and shape so as to result in the light being reflected from the reflector illuminating the treatment area in a pattern of a predetermined shape and size.

In a more specific embodiment, the light guide pertains to an optical device with an adjustable iris. In one example, the iris pertains to a movable plate or plates defining an aperture constituting the generally transparent portion of the light guide. In another example, the iris pertains to a semiconductor panel with areas that can be selectively rendered transparent or opaque.

Alternatively, the light guide pertains to a rod of transparent material. In a specific example, the transparent material may be formed of acrylic or polycarbonate material.

In yet a further embodiment, the invention pertains to an operatory light used to illuminate a treatment area for treating a patient. The lamp includes a support member upon which an LED light source is mounted. A reflector is included at the rear portion of the housing and is illuminated by light from the LED light source. The reflector reflects the light in a beam past the support member generally parallel to the central axis of the housing toward the treatment area for illuminating the treatment area. The embodiment further includes a waveguide positioned between the LED light source and the reflector for mixing the visible wavelength light emanating from the LED source to mix the light of different wavelengths into a beam of light that is of substantially uniform color throughout when the beam of light illuminates the treatment area. In addition to, or alternative to a mixing function, the waveguide also serves to shape light emitted from one or more LEDs into a specific pattern of light. In a preferred embodiment, the light is emitted in a rectangular pattern.

In a specific embodiment, the light source includes red, green and blue LED devices that together produce light in a plurality of wavelengths. Alternatively, the light source pertains to a single white LED producing light in a plurality wavelengths.

In another specific embodiment, the waveguide is a rod of transparent material that has ridges formed along the sides thereof and extends generally in a direction parallel to the direction of the light beam from the LED light source to the reflector. Non-limiting examples of transparent materials are acrylic or polycarbonate materials. Alternatively, the light guide may be a holographic diffuser (See, e.g., U.S. Pat. Nos. 5,471,327 and 5,926,293).

In view of the inventors' novel utilization of LED lights in reflective-type dental operatory lamps, it has been realized that the implementation of filters can improve the light output for dental purposes. In a further embodiment, the invention pertains to an operatory light used to illuminate a treatment area for treating a patient that incorporates strategically placed filters to eliminate undesired wavelengths of light before approaching the treatment area. The lamp is adapted to be movably mounted at a predetermined position above the treatment area to facilitate a doctor in treating the patient. The lamp includes a housing having a front portion toward the treatment area and a rear portion away from the treatment area. The front portion of the housing includes an elongate support member extending across a generally central axis of the housing. An LED light source is mounted on the support member generally at the central axis of the housing for generating and projecting light rearward away from the treatment area, with the LED light source having a base toward the treatment area and a lens away from the treatment area. A reflector is included at the rear portion of the housing and is illuminated by light from the LED light source. The reflector reflects the light in a beam past the support member generally parallel to the central axis of the housing toward the treatment area for illuminating the treatment area. As alluded to above, the embodiment further includes an optical filter for eliminating undesired visible wavelengths from the light emanating from the lamp and prior to illuminating the treatment area.

The optical filter may pertain to a shield member at the front of the housing transmitting and filtering the light reflected by the reflector toward the treatment area. The optical filter may include a filter member positioned between the light source and the reflector transmitting and filtering the light generated at the light source and directed toward the reflector. In a specific embodiment, the filter member pertains to a semiconductor panel with areas that can be selectively rendered opaque to light of a selected visible wavelength. In another specific embodiment, the filter member is movably mounted for selective movement between a first position in which it is illuminated by light from the light source directed to the reflector and a second position in which it is not illuminated by light from the light source directed to the reflector.

The inventors have realized that dental lights, and LED-type lamps in particular, need to be closely calibrated to provide the proper and desired light intensity. Once a lamp is installed at a customer site, there is the possibility that, over time, the lamp will deviate from its original calibration. The inventors have thus devised a lamp that has the ability to self-calibrate over the life of the lamp. Accordingly, in a further embodiment, the invention pertains to an operatory light used to illuminate a treatment area for treating a patient that comprises circuitry connecting its light source to a source of electrical power and a controller associated with the circuitry for selectively controlling the level of power provided to the LED light source to control intensity of the light produced by the LED light source. In addition, the embodiment includes an optical sensor illuminated by the light generated by the light source for detecting the level of the intensity of the light impinging the sensor at predetermined wavelengths and generating a signal indicative of such light intensity to be provided to the controller. Similar to other embodiments, this lamp embodiment is adapted to be movably mounted at a predetermined position above the treatment area to facilitate a doctor in treating the patient, and includes a housing having a front portion toward the treatment area and a rear portion away from the treatment area. The front portion of the housing includes an elongate support member extending across a generally central axis of the housing, and an LED light source is mounted on the support member generally at the central axis of the housing for generating and projecting light rearward away from the treatment area, with the LED light source having a base toward the treatment area and a lens away from the treatment area. A reflector is included at the rear portion of the housing and is illuminated by light from the LED light source. The reflector reflects the light in a beam past the support member generally parallel to the central axis of the housing toward the treatment area for illuminating the treatment area.

In one example, the light source comprises red, green and blue LED light devices and the controller controls the intensity of the light produced by each of the LED Light devices. In one example, the optical sensor detects the intensity of the light produced by the LED light source in each of the red, green and blue wavelengths. In another example, the controller controls the level of the power provided to the LED light source at least in part in response to the signal generated by the optical sensor. In another example, the light source pertains to a white LED light source and the controller controls the intensity of the LED light device.

The inventors have realized that temperature control is an important issue in view of the novel embodiments taught herein that utilize LED light sources in dental operatory lights. Since LED lights can become exceedingly hot, dental personnel run the risk of severe burn when manipulating lights. Moreover, the light itself runs the risk of damage if the light exceeds certain temperatures for a period of time. In a further embodiment, the invention pertains to an operatory light used to illuminate a treatment area for treating a patient. The lamp is adapted to be movably mounted at a predetermined position above the treatment area to facilitate a doctor in treating the patient. The lamp includes a housing having a front portion toward the treatment area and a rear portion away from the treatment area. The front portion of the housing includes an elongate support member extending across a generally central axis of the housing. An LED light source is mounted on the support member generally at the central axis of the housing for generating and projecting light rearward away from the treatment area, with the LED light source having a base toward the treatment area and a lens away from the treatment area. A reflector is included at the rear portion of the housing and is illuminated by light from the LED light source. The reflector reflects the light in a beam past the support member generally parallel to the central axis of the housing toward the treatment area for illuminating the treatment area. The embodiment further includes circuitry connecting the light source to a source of electrical power and a controller associated with the circuitry for controlling the level of power provided to the light source to control intensity of the light produced. The embodiment also includes a temperature sensor in a heat transfer relationship with the LED light source for detecting the temperature of the LED light source and generating a signal indicative of the temperature of LED light source to be provided to the controller.

In a specific embodiment, the controller controls the level of power provided to the LED light source at least in part in response to the signal generated by the temperature sensor. In another embodiment, the LED light source is mounted on a printed circuit board and the temperature sensor is mounted on the printed circuit board. In a more specific embodiment, the circuitry includes a power quality device having a rectifier and a regulator mounted on a printed circuit board and the temperature sensor is mounted on the printed circuit board.

Traditional halogen reflective lamps are known to emit light of undesired wavelengths and intensities. To address this problem, halogen light manufacturers intentionally disrupt the surface of the reflector, by creating facets and the like, which act to 'soften' the emitted light. In contrast to this conventional technique, the inventors' realizations of how to implement LEDs in a reflective type lamp have led to the discovery that a reflector can be intentionally made with a very smooth surface that avoids the problems encountered with halogen lamps. According to another embodiment, a dental light is provided that has a reflector having a surface that is generally smooth over the entire extent thereof. The reflecting surface is generally free of facets and reflects the full spectrum of light in visible and infrared wavelengths.

In a specific embodiment, the reflective surface includes a coating of aluminum thereon. The reflector itself may be formed of aluminum that has a polished front face. In other embodiments, the reflector may comprise a film of reflective material, where the film has a self-adhesive backing and reflective face. The reflector may also include attachment portions on a back surface away from the reflective surface which aid in the securing of the reflector to the housing of the lamp. In addition the back surface may include alignment portions that enable the alignment of the reflective surface. In a specific embodiment, the reflector is of an integrally formed construction, including the attachment portions and alignment portions being integrally formed in the reflector.

As noted above, the issue of heat generation from the LED lamp should be addressed. In an alternative embodiment, a thermoelectric cooling device is positioned on the lamp relative to the LED light source so as to assist in the transfer of heat generated from the light source. In a particular embodiment, the thermoelectric device is a Peltier-type device.

BRIEF DESCRIPTION OF THE SEVERAL VIEWS OF THE DRAWINGS

While the specification concludes with claims particularly pointing out and distinctly claiming that which is regarded as the present invention, this invention can be more readily understood and appreciated by one of ordinary skill in the art from the following description of the invention when read in conjunction with the accompanying drawings in which:

DETAILED DESCRIPTION OF THE INVENTION

Although the foregoing description contains many specifics, these should not be construed as limiting the scope of the present invention, but merely as providing illustrations of some representative embodiments. Similarly, other embodiments of the invention may be devised that do not depart from the spirit or scope of the present invention. Features from different embodiments may be employed in combination.

Figure 1:
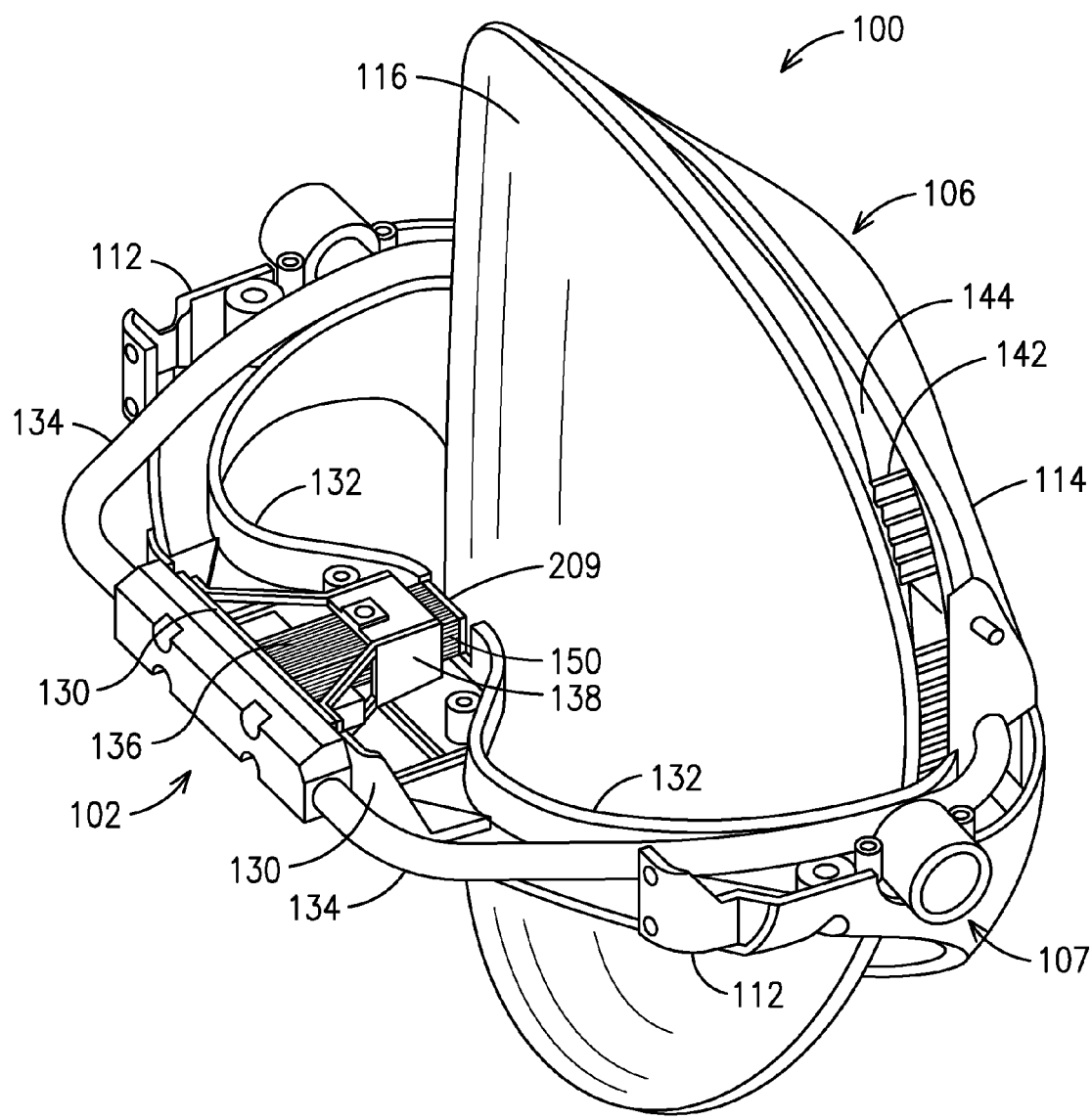
FIG. 1 is a perspective view of a dental operatory lamp according to a particular embodiment of the invention.

FIG. 1 illustrates a perspective view of a current embodiment of the invention, generally indicated at 100, of a light source structure constructed according to principles of the invention. Light source structure 100 may generally be characterized as a lamp. Lamp 100 is powered by electricity, and functions to provide illumination to a work area disposed a distance from the lamp front, generally indicated at 102. Desirably, the work area illuminated by lamp 100 is shadow-free, and appears relatively uniform in illumination color and intensity. For most applications, the illuminated target work area is considered to have an approximately flat footprint and a depth normal to that footprint. That is, the illuminated region is generally structured to encompass a volume disposed proximate the footprint.

Illustrated lamp 100 can include an attachment structure (not shown) operable to connect lamp 100 to suspension structure in the work area. Such an attachment structure is typically attached at a back 106 or sides 107 of lamp 100, although any convenient arrangement is operable. Typical suspension structure in a dental operatory permits a user to orient the lamp in space operably to aim the light output of lamp 100 at the desired target area. Certain embodiments of the invention provide a lamp having reduced weight and/or intrusive volume compared to commercially available lamps. Such reduced weight lamps permit a corresponding reduction in mass of the lamp suspension arrangement, thereby increasing ease of manipulation of the lamp to orient its output toward a target.

In use in an environment such as a dental operatory, a front shield (not shown) can be provided as a protective cover to block migration of dust and contaminated aerosols into the lamp interior. A front surface of such a shield may be structured to provide an easily cleanable surface, whereby to maintain sterility of the operatory area. In certain embodiments, the shield may incorporate one or more lenses to focus, or otherwise modify, the light output of lamp 100. Whether or not a focusing lens is provided, a shield made from Lexan.®, or other similar optically useful and formable material, can be provided to completely encase the front of a dental lamp to resist contamination of, and to facilitate cleaning of, the lamp. The shield may be injection molded and may include focusing lenses. Desirably, the shield, or a portion of lamp housing 114, can be hinged, or otherwise openable by a user, to provide access to the interior of lamp 100 for maintenance or replacement of a light generating element.

Figure 3:
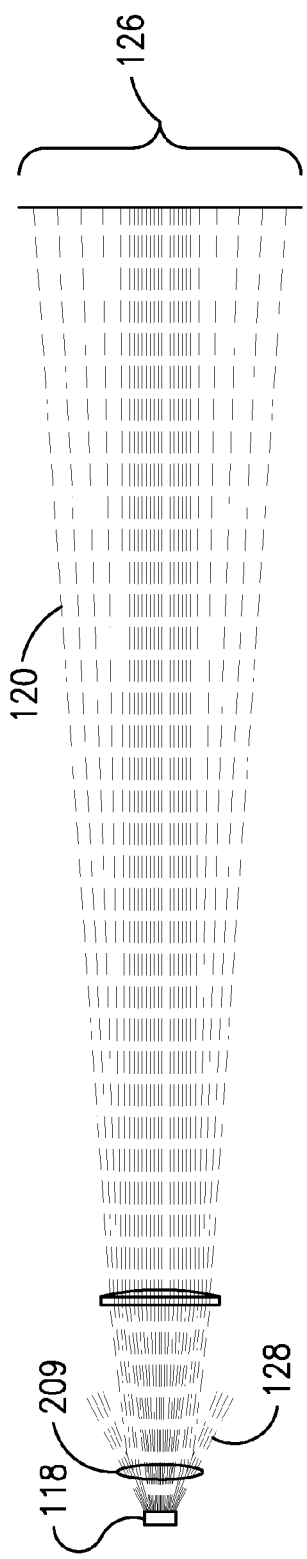
FIG. 3 illustrates a component arrangement and a representative LED light output in a dental operatory lamp.

With reference to FIG. 3, an LED 118 emits light indicated by a plurality of rays 120. An operable LED can include a 3 watt LED, such as that sold by Lumileds Lighting US, LLC under the Brand name Luxeon, part number LXHL-LW3C.

Typically, a reflective element, generally indicated at 116, is provided to direct the LED's light output toward a target. In a particular embodiment, reflective element 116 can be a concave aspheric reflector which collects the light emanating from the mixing rod and focuses it onto the plane of the patient's face ("image plane"). The reflector surface contour can be a simple 2D ellipse section revolved around the central optical axis. A focusing lens 209 may be included in an arrangement effective to collimate rays 120 and further direct them to an illuminated area indicated at 126. In certain embodiments of the invention, area 126 corresponds to the target footprint of the lamp 100. In such case, it is desired that the illumination emitted from each module 118 is substantially uniform over area 126. Certain rays 128 may be emitted in a direction other than desired for impingement on area 126. Such rays 128 are characterized as stray light. As indicated by the illustrated collection of rays 120, area 126 sometimes has a higher intensity of illumination at its center, and may fade to a decreased intensity near its perimeter, as discussed with reference to FIG. 5. In a preferred embodiment, light is illuminated in a generally rectangular pattern having a perimeter that is starkly contrasted with respect to the non-illuminated region surrounding the rectangular pattern. In another embodiment, the LED light source 118, lens 209, and all associated optics are arranged in harmony to produce a substantially uniform intensity over its illuminated footprint at a selected focal distance. Furthermore a waveguide 136 may be positioned between the LED light source 118 and reflector 116.

Figure 2:
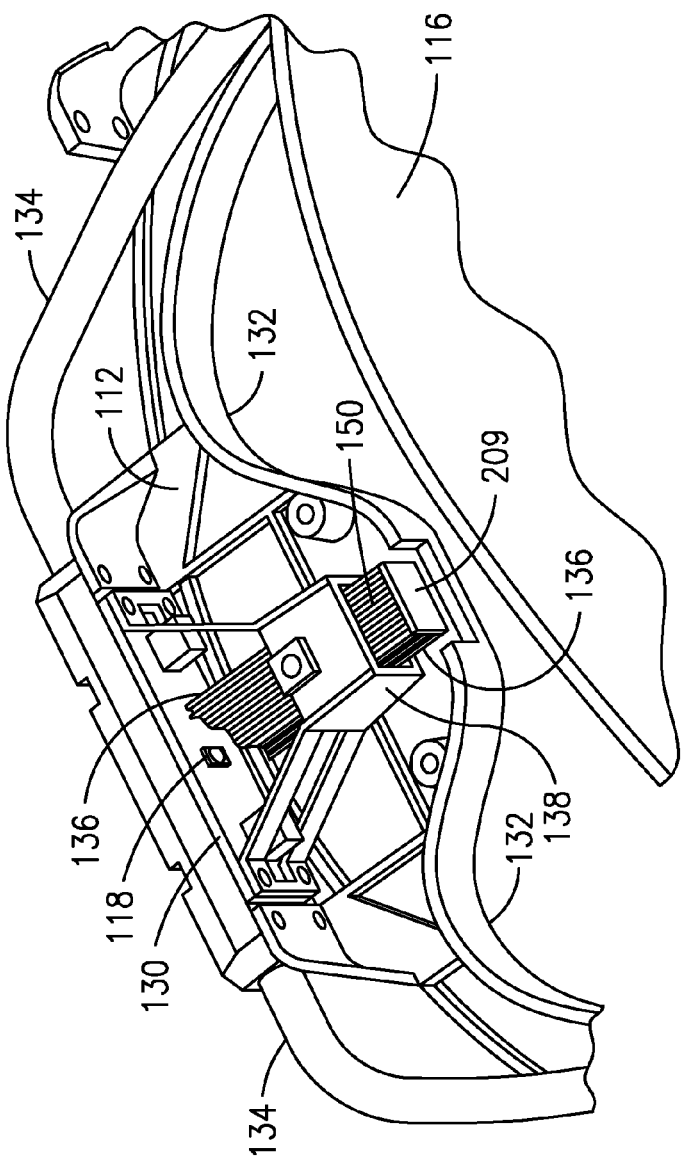
FIG. 2 shows a side perspective view of a close up of the dental operatory lamp shown in FIG. 1 with a breakaway to reveal an LED light source.

As best shown in FIG. 2, LED light source 118 is typically mounted onto a bracket 112 associated with lamp housing 114. Desirably, the bracket 112 assembly is structured to provide simple and rapid installation and removal of LED light source 118, and includes connection structure for the electricity supplied to the LED and may further include a metal core circuit board 130. It is further desirable for bracket 112 to be formed from a material capable of conducting heat or, alternatively, to be associated with heat conducting pipes 134. Advantageously, bracket 112 and/or heat pipe 134, together with housing 132 may be structured and arranged to dissipate any heat generated by LED light source 118 in a direction away from the front 102 of the lamp 100. In some embodiments, use of heat pipe 134 is particularly desirable since a large heat sink positioned directly behind the metal core board with the heat-generating LEDs may significantly obscure the light focusing onto the image plane. Through use of a heat pipe 134 or equivalent structure, the heat can be conducted away via heat pipes 134 to a heat sink housing positioned on the back of the reflector where it does not obscure the light.

As shown in FIG. 1, an exemplary heat sink housing can include heat sink fins 142. The heat sink fins 142 can be integral with the outer housing 114 of the lamp 100 and constructed of any heat conducting or dissipating material, such as cast aluminum. To increase cooling, a fan can be used to draw air into a gap 144 (see FIG. 1) between the reflector 116 and the housing 114. To maximize surface area and thus cooling, the inside of the heat sink/housing includes fins or ribs 142 that form air channels therebetween.

Figure 7:
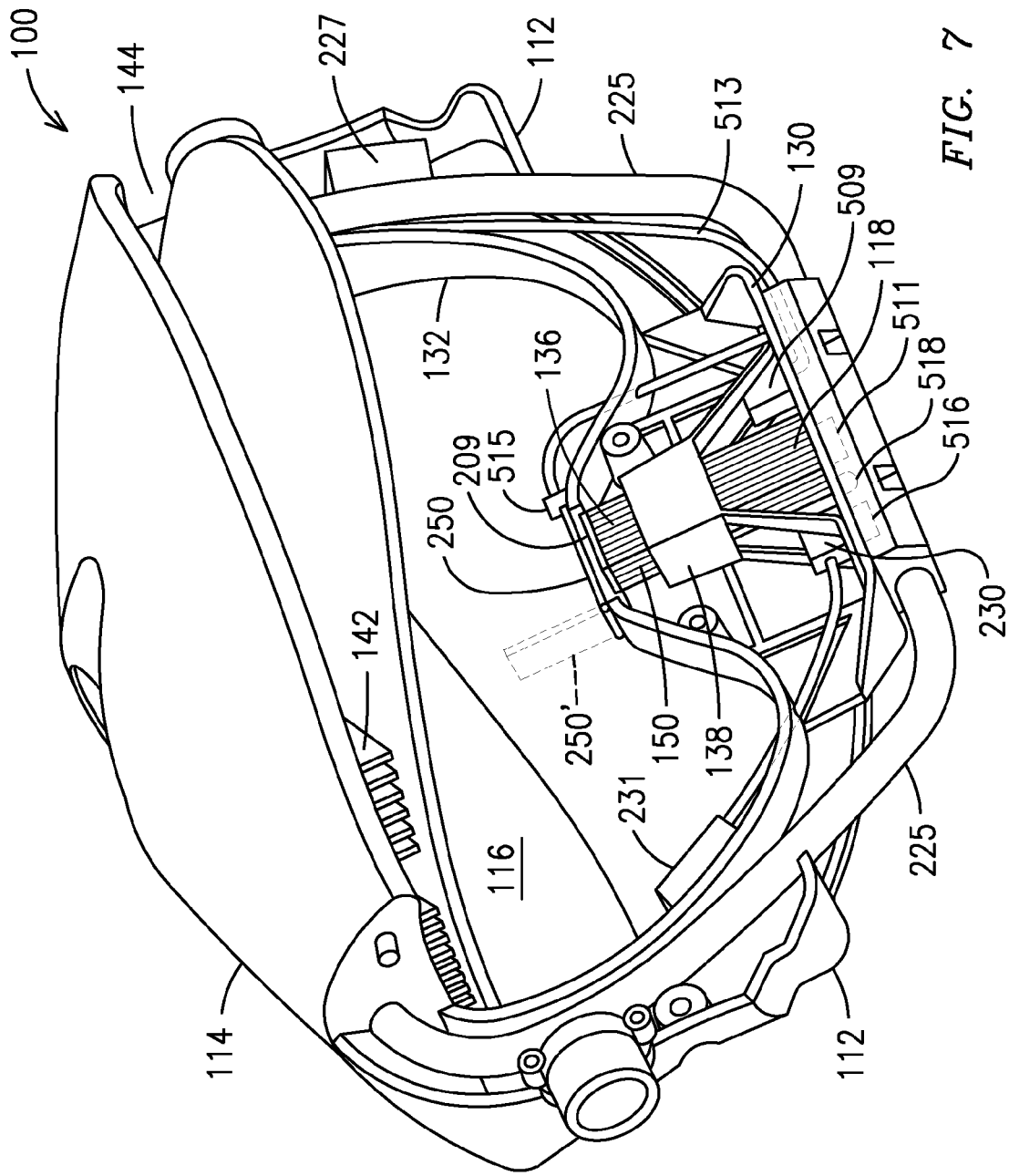
FIG. 7 is a perspective view of a dental operatory lamp according to a particular embodiment of the invention.

Those skilled in the art will appreciate in view of the teachings herein that the heat pipe 134 may be substituted by other heat transfer conduits such as a solid rod having a high coefficient of heat transfer. Alternatively the heat transfer conduit is a hollow tube for conducting a flow of cooling air past the LED light source 118 for absorbing heat generated at the LED light source 118 and directing heated air to the heat sink 142. FIG. 7 shows a hollow tube heat transfer conduit 225 that communicates with the heat sink having fins 142. The embodiment includes a fan 227 that is in fluid communication with the hollow tube 225 for moving air through the tube 225. The embodiment shown in FIG. 7 further comprises a thermoelectric cooling device 230 adjacent to the LED light source 118. The thermoelectric cooling device may be of a type known in the art including, but not limited to, a Peltier-type device. The lamp includes a separate power supply 231 to the thermoelectric cooling device 230 that is preferably on the housing but in thermal isolation to the thermoelectric cooling device 230. Alternatively, the thermoelectric cooling device 230 is powered by the lamp power supply provided to the printed circuit board 130 via circuitry 513. The thermoelectric cooling device 230 acts in conjunction with the hollow tube 225 for transferring heat from the LED light source 118. Alternatively, the lamp can be equipped with the thermoelectric cooling device 230 without a heat transfer conduit.

Figure 4:
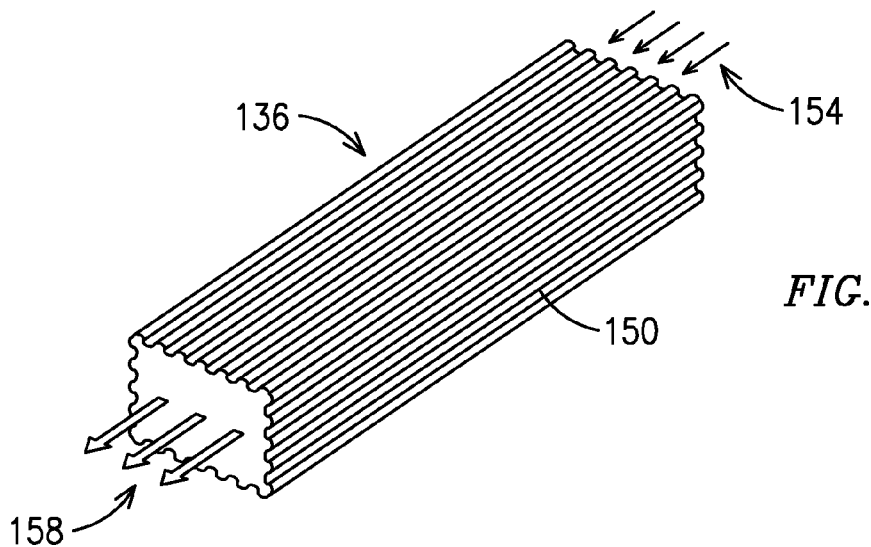
FIG. 4 illustrates an embodiment of an optical waveguide in a dental operatory lamp of the invention.

In order to produce homogenous light when multiple LEDs of different colors (for example, red, greed, blue, and amber) are used, the light emitting from each individual LED should sufficiently overlap the light from all the other LEDs. In a particular embodiment, a clear rectangular rod made of acrylic serves this function and is referred to herein as an optical waveguide 136. It is understood that the waveguide 136 can be made out of any suitable material capable of acting as an optical light guide. The performance of the waveguide 136 can be significantly enhanced with the addition of periodic features or "ripples" 150 on the outside walls of the waveguide. As illustrated in FIG. 4, light from multiple LEDs of different colors 154 (e.g., red, green, blue, and/or amber) are introduced through one end of the waveguide rod 136 and emanate from another end of the waveguide rod 136 as a composite white light 158. One particular embodiment combines the light from four different colored LEDs (red, blue, green, and amber) to produce white light. By varying the ratios of the different colors, the character of the white light can be changed. Specifically, white light with coordinated color temperatures (CCTs) of 4200.degree. K and 5000.degree. K can be produced while maintaining a high color rendering index (CRI), typically in excess of 75. Blue light typically occurs in the peak wavelength range of 445 nm to 465 nm. Green light typically occurs in the dominant wavelength range of 520 nm to 550 nm, amber light in the range of 584 nm to 597 nm, and red light in the range of 613 nm to 645 nm. A rod support 138 can be used to secure waveguide 136 in place.

The waveguide 136 also serves the function of shaping the light received to emit light according to a predetermined pattern. The waveguide 136 shown serves to promote light in a rectangular pattern. Thus, the light shaping function is achieved whether one white LED is used or multiple LEDs of different colors.

Multiple LEDs of each color can be mounted using reflow surface mount techniques to achieve optimum optical density. In a particular embodiment, a conventional metal core board (MCB) 130 can be used. Alternatively, a conventional fiberglass laminate (FR4) printed circuit board (PCB) material can be used. LEDs, particularly red and amber LEDs, have the characteristic that their light output decreases significantly as their temperature raises. Heat management can be critical to maintaining optimum light output and therefore the proper ratios of light intensity to maintain the desired CCT and CRI.

The lamp 100 of the present invention includes a number of different operating modes which provide different light characteristics, as described in Table 1.

TABLE 1

| Mode | Nominal CCT (°K) | CRI | Approximate relative peak intensity | | | | Comments |
| --- | --- | --- | --- | --- | --- | --- | --- |
| | | | Blue | Green | Amber | Red | |
| "Cool white" | 5,000 | 70+ | 0.72 | 0.70 | 0.75 | 1.00 | Meets European user preference for cooler white light. |
| "Warm white" | 4,200 | 70+ | 1.00 | 0.80 | 0.75 | 1.00 | Meets US user preference for warmer white light. |
| "No-cure" | N/A | N/A | ~0 | 0.30 | 0.60 | 1.00 | Greatly reduced flux below 500 nm will not cure dental adhesives. |

In this design, the ratios of the four colors are controlled with a variation of pulsed width modulation of the current. During the assembly and test of the lamp 100, each color is independently characterized for peak wavelength, spectral spread (full width half max), and illuminance (lux) at the image plane at a predetermined maximum current. Using test software based on both theoretical and empirical predictions, these values are used to generate a table of duty cycles for each wavelength at each of the three operating conditions: 4200K, 5000K, and "No Cure" modes at start up (board temperature equal to ambient temperature). These tables then can be stored on an electronic memory device (chip) that matches the serial number of the lamp. The PWM controller then looks up the duty cycle table on the memory chip and sets the duty cycles accordingly when the lamp is first started. At this time, the test software algorithm can also produce and store duty cycle tables for the full range of operating board temperatures, as discussed in more detail below.

In a particular embodiment of the invention, temperature compensation or measurement may be included. Since each color LED has a different sensitivity to heat, a compensation algorithm can be used to set the drive current values for each color as a function of temperature. The compensation algorithm may be adapted to assume that LEDs of a given color do not exhibit significant differences in temperature sensitivity. As a result, each lamp need not be characterized thermally but rather may depend on the theoretical and empirically determined temperature relationships in the algorithm.

In a particular embodiment as shown in FIG. 7, a thermistor 511 and controller 509 are provided on the LED circuit board 130. The thermistor 511 senses the temperature of the board 130 temperature from which the LED temperature can be derived, based on previously determined empirical values. The controller 509 communicates with a power source (not shown) via circuitry 513 and controls the current to the LED responsive to signals from the thermistor 511. The lamp is equipped with a rectifier 516 and a regulator 518 that serves to preserve power quality to the LED.

Further, as discussed above, it is desirous for the lamp to maintain a predetermined light intensity once installed. The lamp shown in FIG. 7 includes an optical sensor 515 that communicates with controller 509. Light from the LED light source 118 illuminates the optical sensor 515 and based on the value obtained from the sensor, the controller 509 controls the intensity of the light.

The electrical power supply for supplying electrical power to the LED of the LED light source 118 is selectively operable to provide an intensity adjustment for the LED as controlled by the controller 509. In an embodiment where multiple LEDs are provided, the electrical power supply can be selectively operable to control the level of power transmitted to each LED independent of the level of power transmitted to the other LEDs. The LED can be configured to have a variable color output. For example, the intensity adjustment can range from 0 to about 2500 FC. The intensity adjustment can be continuous throughout its range of adjustments or, alternatively, can be adjustable at discrete settings within its range of adjustments. Controller 509 in communication with the power supply of the LED light source 118 can control the level of power transmitted to the LED, and thus the output intensity of the light from the lamp. Suitable controllers for use with the present invention are well known in the art and include, but are not limited to, any programmable digital electronic component that incorporates the functions of a central processing unit (CPU) on a single semiconducting integrated circuit (IC).

In an alternative embodiment of the invention, a dental operatory lamp used to illuminate an operating area comprises a housing having a front directed toward the operating area and a rear facing away from the operating area. A plurality of light emitting diodes (LEDs) can be included. An adapter configured for receiving at least one non-light emitting diode (non-LED) light source is located within the housing. The at least one non-LED light source may consist of a group of lights that can be selected from, for example, Quartz halogen, tungsten halogen, incandescent, xenon, fluorescent, fiber optics, gas plasma, laser, ultraviolet, and blue light. The at least one non-LED light source may also include the group of lights selected from, for example, dental curing light, oral cancer screening light, decay detection (cavities and caries) blood detection sterilization and tooth whitening light.

Figure 5:
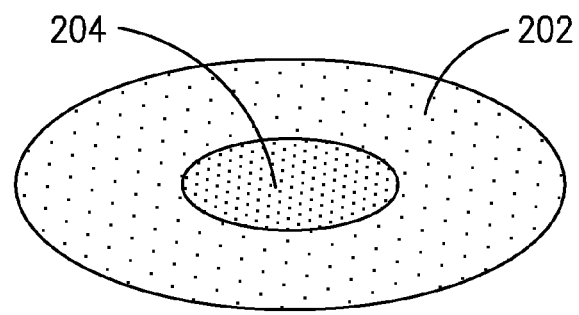
FIG. 5 illustrates a representative illumination pattern for the dental operatory lamp according to one embodiment of the invention.

A particular embodiment of the invention includes a dental operatory lamp used to illuminate an operating area having a housing with a front directed toward the operating area and a rear away from the operating area. The LED light source 118 is positioned with the LED aligned toward predetermined points on the reflective element 116 for directing the light from the LED light source 118 toward the front of the lamp in a pattern that focuses light from the lamp to a central area of illumination of high intensity 204, with significantly reduced intensity illumination 202 outside the central area, as shown in FIG. 5. Particular representative patterns of focused light emanating from the dental operatory lamps of the present invention include, for example, a pattern of focused light that can be elliptically shaped and may be about 3 inches by about 6 inches (7.62 cm by about 15.24 cm) in size. In a particular embodiment, the reduced intensity illumination 202 outside the central area of illumination 204 decreases in intensity by 50% of a maximum intensity relative to the central area of illumination of high intensity. The central area of illumination of high intensity 204 can have a pattern size of at least 50 mm by 25 mm. The reduced intensity illumination 202 outside the central area can be configured to decrease in intensity progressively and smoothly relative to the central area of illumination of high intensity. The pattern can be configured to have a brightness of greater than about 20,000 Lux at a focus height of 700 mm from a target. The illumination on the central area of illumination of high intensity 204 at a distance of 60 mm can be configured to be less than about 1200 Lux. Illumination at the maximum level of the dental operating light in the spectral region of 180 nm to 400 nm can be configured to not exceed 0.008 W/m2.

In a preferred embodiment, a rectangular pattern of light is emitted that has an illuminating region with a perimeter possessing a stark contrast in intensity relative to the surrounding non-illuminated area of the rectangular pattern. In a specific example, the non-illuminated area surrounding the illuminated rectangular pattern has at least a 70%, 80% or 90% decrease in intensity compared to the light in the illuminated rectangular pattern.

Figure 8:
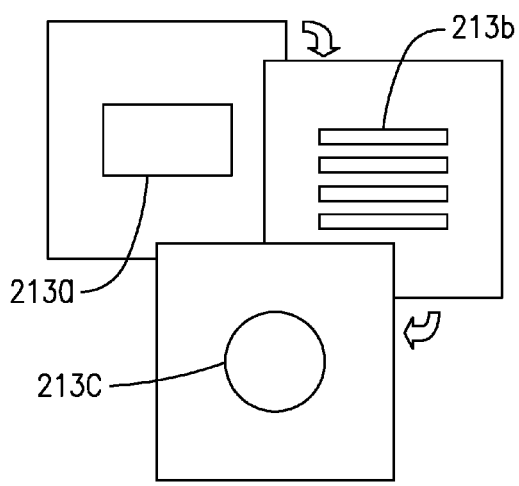
FIG. 8 illustrates an embodiment of an optical light guide having predetermined patterned apertures for use in a dental operatory lamp of the invention.
Figure 9:
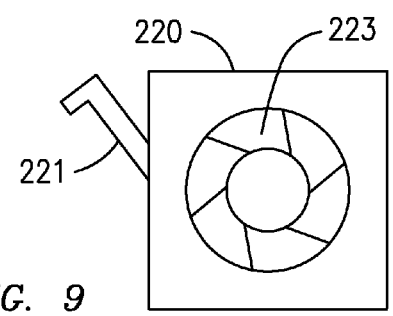
FIG. 9 illustrates an embodiment of an optical light guide having an adjustable iris for use in a dental operatory lamp of the invention.

FIG. 7 shows an embodiment that incorporates a light guide 250 located on the rear end of the LEDs 118 whereby the light guide 250 allows passage of light therethrough according to a predetermined pattern as discussed in the preceding paragraph, and/or serves as an optical filter, as discussed further below. The light guide 250 is shown as being positioned rearward of a lens 209. The light guide 250 and lens 209 may be used together as shown or individually where one or the other is omitted from the lamp 100. The light guide 250 is shown as being able to flip up (shown as 251, dashed lines) when its use is not desired. FIG. 8 shows examples of plate-type light guides 211 having respective apertures 213a-c, which may be implemented as the light guide 250 shown in FIG. 7. Alternatively the light guide 250 takes the form of an adjustable iris which will shape light according to an intended pattern. FIG. 9 shows an example of one such iris 220 having an adjustable aperture 223 that is controlled by lever 221. Those skilled in the art will appreciate that the iris may be automated thereby avoiding the need for lever 221. Accordingly, a switch can be provided on a convenient location on the lamp to actuate the iris. In addition to the specific examples shown in the drawings, those skilled in the art will appreciate that other types of light guides may be implemented that can shape light according to the desires of the operator, including but not limited to, a LCD/semiconductor panel with areas that can be selectively rendered transparent or opaque. (See for example U.S. Patent Publications 20090207331, 20090230412 and 2005026994 for examples of liquid crystal displays). By impressing a current on the panel you can modulate the generally transparent and generally opaque areas on the panel. This can be used to generate specific patterns of light.

Figure 6:
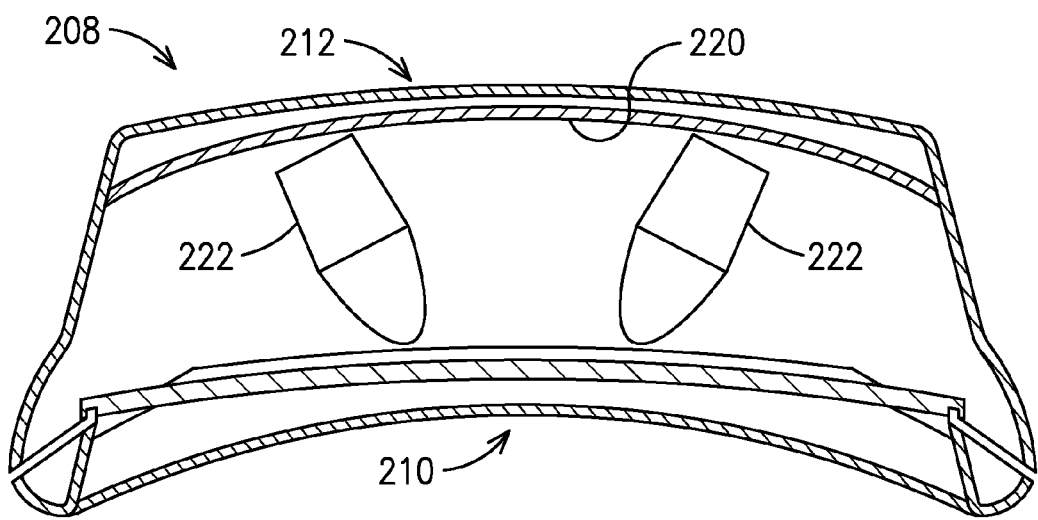
FIG. 6 is a cross-section of a light module having a reflective interior reflective surface according to a particular embodiment of the invention.

Yet another embodiment of the invention is shown in FIG. 6, wherein a dental operatory lamp used to illuminate an operating area includes a lamp assembly 208 having a front 210 directed toward the operating area and a rear 212 away from the operating area. A reflector module 220 can be located within the lamp assembly 208, and more specifically, can be located at the rear 212 of the lamp assembly 208. A plurality of light emitting diodes (LEDs) can optionally be located in a reflector module 222. Optionally, a light mixing rod (not shown) may be included as part of the reflector module 222 to produce homogenous light from the multiple LEDs of different colors. The lamp assembly 208 can include a curved or faceted interior reflective surface 220. The LEDs can be directed toward the curved or faceted interior reflective surface 220 for directing the light from the LEDs toward the front 210 of the lamp in a pattern that focuses light from the lamp to a central area of illumination of high intensity, with significantly reduced intensity illumination outside the central area. The reduced intensity illumination outside the central area can be configured to decrease in intensity by 50% of a maximum intensity relative to the central area of illumination of high intensity. The reduced intensity illumination outside the central area may be configured to decrease in intensity progressively and smoothly relative to the central area of illumination of high intensity. The light pattern can have a brightness of greater than about 20,000 Lux at a focus height of 700 mm from a target. The illumination on the central area of illumination of high intensity at a distance of 60 mm may be less than about 1200 Lux. The illumination at the maximum level of the dental operating light in the spectral region of 180 nm to 400 nm may be configured to not exceed 0.008 W/m.sup.2.

The lamp 100 of the present invention allows the user to set various chromaticity settings, such as sunlight equivalent D65 or simulated fluorescent lighting for improved dental shade matching. It also allows the addition of thermal, color, or intensity feedback to better maintain light characteristics over the life of the product, and permits adjustment of light intensity independent of color setting. The lamp 100 also is adapted to provide different configurations and forms of color mixing light guides. Specifically, the lamp 100 provides a user selectable mode with reduced irradiance in the near UV and blue wavelengths to allow adequate illumination while not initiating curing of UV-curable dental composites and adhesives. The lamp design can provide longer life through use of LEDs instead of incandescent bulbs and which can be further achieved through use of heat pipes, finned rear housing and fan cooling which maintain low LED temperature even at high currents.

Figure 14:
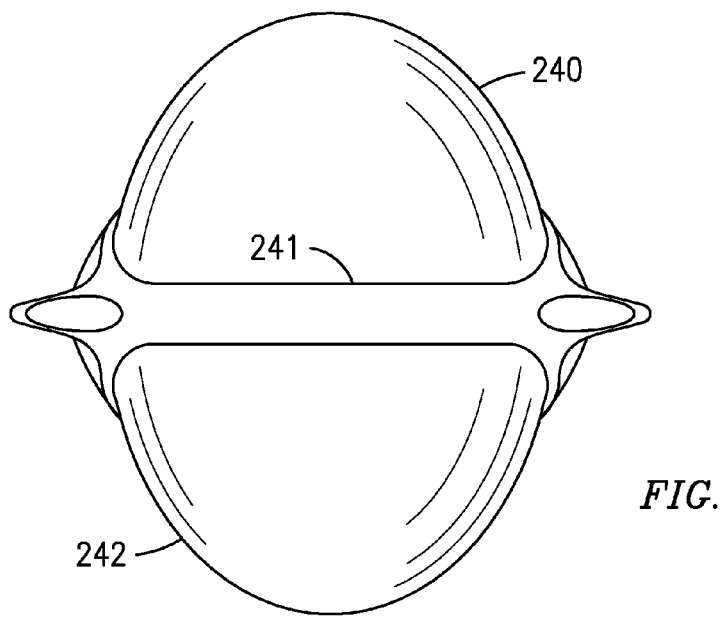
FIG. 14 is a front view of a dental operatory lamp embodiment that includes a front filter.

In an alternative embodiment, the light guide 250 also operates as an optical filter and is positioned at the rear-end of the LED light source 118 so as to intercept light from the LED light source 118 as it travels to the reflector 116. The optical filter is designed to eliminate undesired visible wavelengths of light. Moreover, in place of filters or in addition to filters adjacent to the LED light source 118, the lamp may include a shield that is designed to filter light being reflected from the reflector to the treatment area so as to filter out undesired wavelengths of light. FIG. 14 pertains to a front view of a dental lamp embodiment that includes a first shield 240 and second shield 242 adjacent to a front support member 241.

Figure 11:
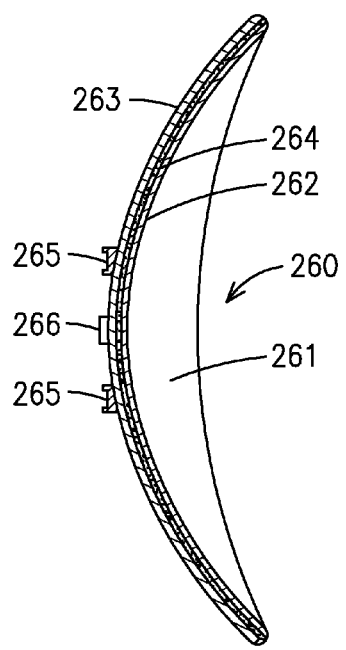
FIG. 11 is a cross-sectional view of a first embodiment of a reflector shown in FIG. 11 along axis 12-14.
Figure 10:
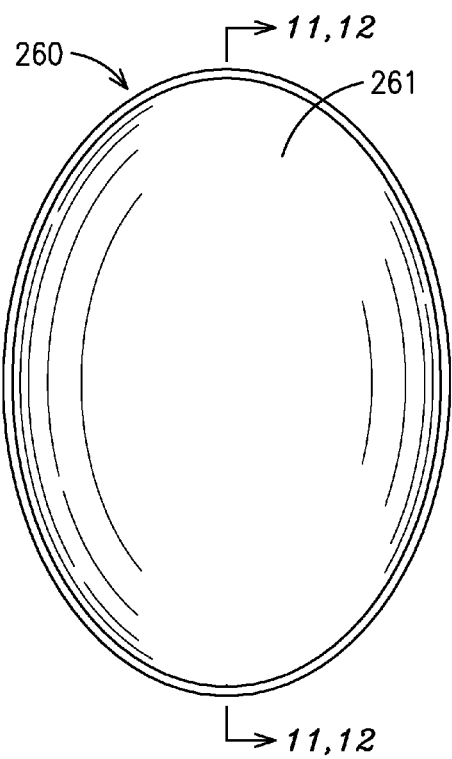
FIG. 10 is a front view of a reflector embodiment for use in a dental operatory lamp.
Figure 12:
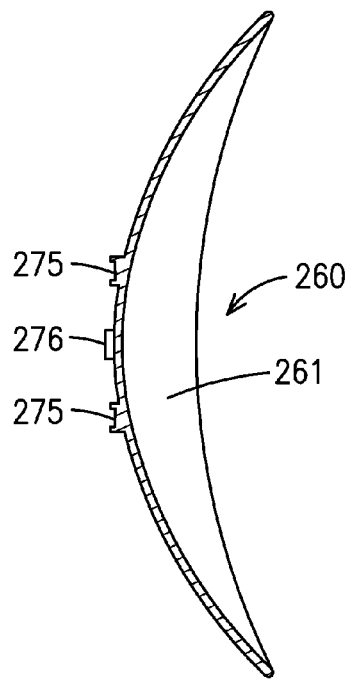
FIG. 12 is a cross sectional view of a second embodiment of a reflector shown in FIG. 10 along axis 12-14.
Figure 13:
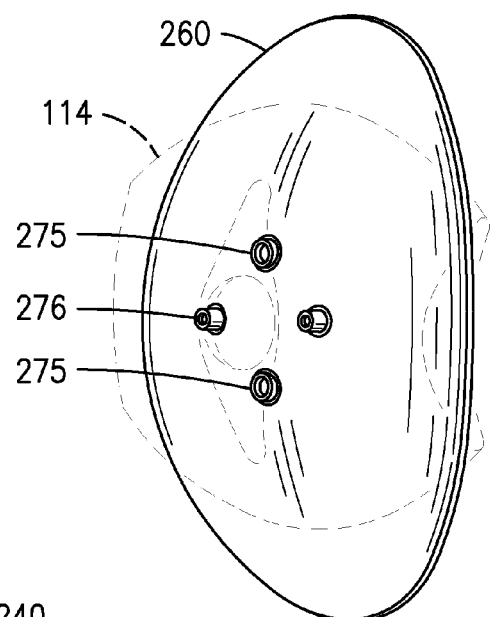
FIG. 13 shows a rear perspective view of the reflector embodiment shown in FIG. 10.

In another embodiment shown in FIG. 10, a reflector 260 is utilized that has a reflecting surface 261 that is generally smooth over the entire extent thereof, is free from facets and reflects the full spectrum of light in visible and infrared wavelengths. The reflector 260 may comprise a coating of aluminum thereon constituting reflecting surface 261. In one example shown in FIG. 11, which is shown as a cross-sectional view of the embodiment in FIG. 10 along the 12-14 axis, the reflector has a concaved structural portion 263 which includes a film having a reflecting surface 262 that is adhered to a structural portion 263 via a self-adhesive backing layer 264. On a back surface of the structural portion 263 are disposed an attachment portion 266 for securing the structural portion 263 to the rear portion of the lamp housing. The structural portion 263 also includes alignment bosses 265 for enabling alignment of the structural portion 263 relative to the treatment area when structural portion 263 is mounted to a housing (see, e.g., 114 of FIG. 1). Alternatively, FIG. 12 shows a cross-sectional view of a different example of the reflector 260 shown in FIG. 10 (along axis 12-14) that is of an integrally formed construction, that includes attachment portion 276 and alignment bosses 275 integrally formed with the reflector 260. In a specific example, the reflector 260 may be formed of aluminum with the front face being polished presenting the reflective surface 261.

Figure 15:
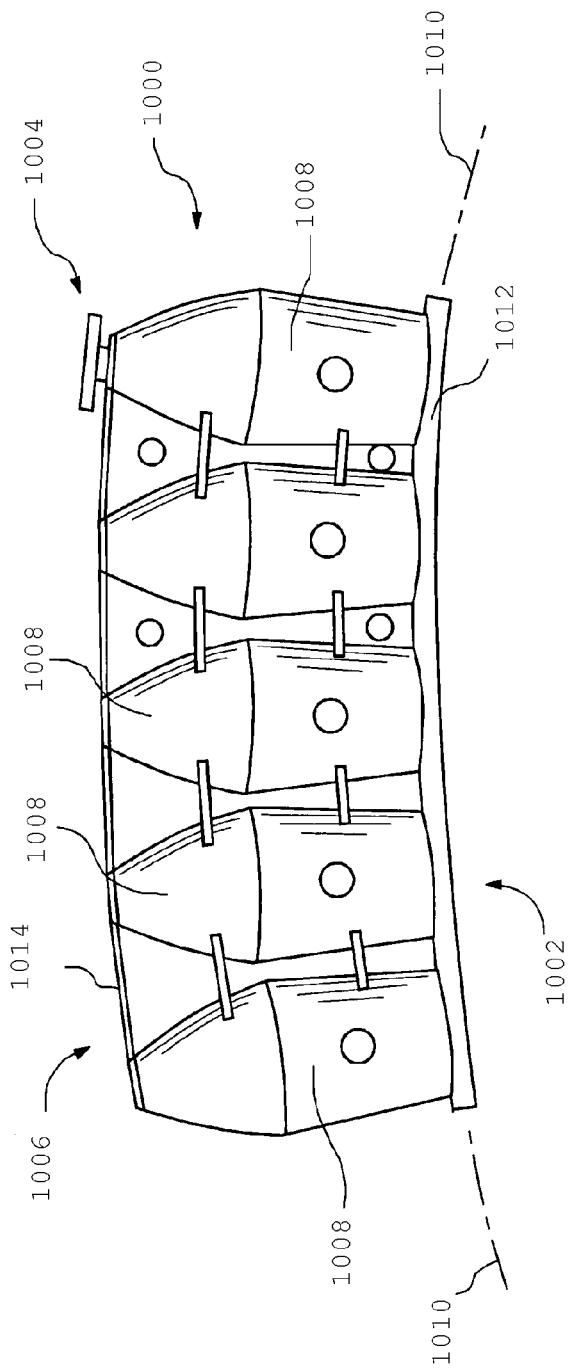
FIG. 15 is a side view representation of a dental operatory lamp constructed according to principles of the invention.

FIG. 15 illustrates a side view of an embodiment, generally indicated at 1000, of a light source structure constructed according to principles of the invention. Light source structure 1000 may generally be characterized as a lamp. Lamp 1000 is powered by electricity, and functions to provide illumination to a work area disposed a distance from the lamp front, generally indicated at 1002. Desirably, the work area illuminated by lamp 1000 is shadow-free, and appears relatively uniform in illumination color and intensity. For most applications, the illuminated target work area is considered to have an approximately flat footprint and a depth normal to that footprint. That is, the illuminated region is generally structured to encompass a volume disposed proximate the footprint.

Illustrated lamp 1000 includes attachment structure, generally indicated at 1004, operable to connect lamp 1000 to suspension structure in the work area. Illustrated attach structure 1004 is carried at a back 1006 of lamp 1004, although any convenient arrangement is operable. Typical suspension structure in a dental operatory permits a user to orient the lamp in space operably to aim the light output of lamp 1000 at the desired target area. Certain embodiments of the invention provide a lamp having reduced weight and/or intrusive volume compared to commercially available lamps. Such reduced weight lamps permit a corresponding reduction in mass of the lamp suspension arrangement, thereby increasing ease of manipulation of the lamp to orient its output toward a target.

Lamp 1000 includes a plurality of light modules 1008 disposed in an array and tilted along an arcuate path 1010 to aim their collective light outputs to impinge on a desired target footprint. Illustrated light modules 1008 are sometimes also called reflective modules. One row of modules 1008 is visible in FIG. 1, although any number of such rows may be repeated in a columnar, staggered, or other arrangement in space to form a 3-dimensional lamp body providing the desired luminescent output.

One currently preferred lamp assembly 1000 includes 3 rows forming 5 columns of modules 1008, for a total of 15 modules in the lamp. Such modules 1008 are desirably spaced apart from each other and aimed in harmony to form a shadow-free illumination of a target region. In the context of this disclosure, the term "shadow-free" means that an object, such as a tool or a user's hand, casts essentially no shadow when placed between the lamp and its illuminated target. It is currently preferred for an output of each module to be shaped to substantially illuminate the entire target footprint. Therefore, the target footprint is fully illuminated by the sum of the outputs of modules 1008. In such an arrangement, an object blocking light emitted by one, or even most, of the modules 1008 still would not cast a shadow on the target footprint. A path along a column between rows may be a straight line, although it is currently preferred that such path (not illustrated, but similar to path 1010) also is arcuate.

Figure 16:
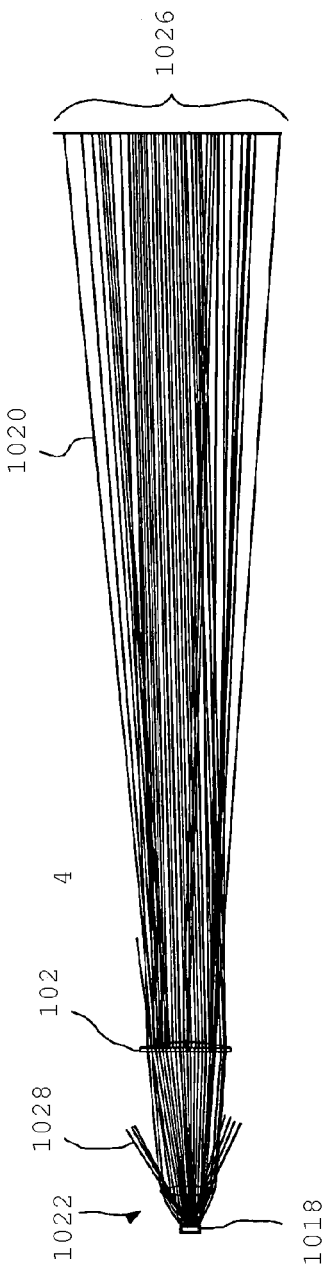
FIG. 16 illustrates a component arrangement and a corresponding light output for a module.

In use in an environment such as a dental operatory, it is preferred to provide a front shield 1012 as a protective cover to block migration of dust and contaminated aerosols into the lamp interior. A front surface of such a shield 1012 may be structured to provide an easily cleanable surface, whereby to maintain sterility of the operatory area. In certain embodiments, shield 1012 may incorporate one or more lenses to focus, or otherwise modify, the light output of lamp 1000. Whether or not a focusing lens is provided, a shield made from LEXAN®, or other similar optically useful and formable material, desirably is provided to completely encase the front of a dental lamp to resist contamination of, and to facilitate cleaning of, the lamp. Illustrated shield 1012 is injection molded, and includes focusing lenses for each of the modules 1008 in a unitary part. Desirably, shield 1012, or a portion of lamp housing 1014, is hinged, or otherwise openable by a user, to provide access to the interior of lamp 1000 for maintenance or replacement of a light generating element With reference to FIG. 16, an LED 1018 emits light indicated by a plurality of rays 1020. An operable LED includes a 3 watt LED such as that sold by Lumileds Lighting US, LLC under the Brand name Luxeon, part number LXHL-LW3C.

Typically, a reflective element, generally indicated at 1022, is provided to direct the LED's light output toward a target. A focusing lens 1024 may be included in an arrangement effective to collimate rays 1020, and further direct them to an illuminated area indicated at 1026. In certain embodiments of the invention, area 1026 corresponds to the target footprint of the lamp 1000. In such case, it is desired that the illumination emitted from each module 1008 is substantially uniform over area 1026. Certain rays 1028 may be emitted in a direction other than desired for impingement on area 1026. Such rays 1028 are characterized as stray light. As indicated by the illustrated collection of rays 1020, area 1026 sometimes has a higher intensity of illumination at its center, and may fade to a decreased intensity near its perimeter. In another embodiment, the LED 1018, mirror 1022, and all associated optics are arranged in harmony to produce a substantially uniform intensity over its illuminated footprint at a selected focal distance.

Figure 17:
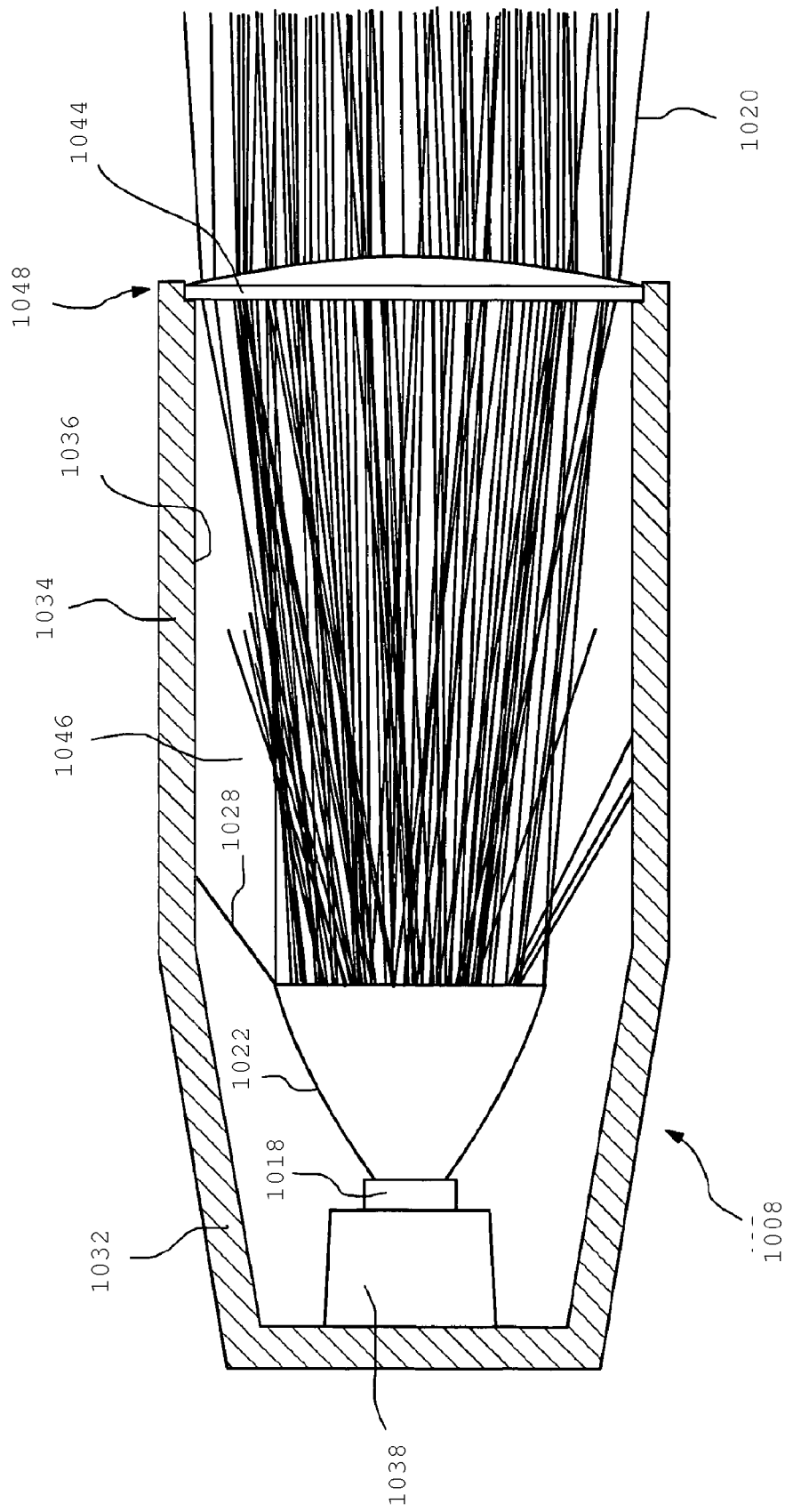
FIG. 17 is a cross-section taken along an axis of a light module constructed according to principles of the invention.

Another exemplary light module 1008 is illustrated in FIG. 17. Housing 1032 of illustrated module 1008 includes a portion that forms a component stray light tube 1034. An interior surface 1036 of tube 1034 may be reflective, but desirably is arranged to resist reflection of incident stray light rays 1028 to reduce emission of such stray rays outside the target footprint. A preferred stray light tube 1034 provides a black, or essentially light absorbing, surface 1036 to resist reflection of stray light rays 1028. It is within contemplation for a stray light tube 1034 to be formed as a distinct component. However, including the stray light tube as a portion of the housing 1032 reduces part count and cost, and simplifies assembly of a lamp 1000.

LED 1018 is typically mounted with respect to housing 1032 by a conveniently structured foundation 1038. Desirably, foundation 1038 is structured to provide simple and rapid installation and removal of LED 1018, and includes connection structure for the electricity supplied to the LED. It is further desirable for foundation 1038 to be formed from a material capable of conducting heat. Advantageously, foundation 1038 and housing 1032 may be structured and arranged to dissipate any heat generated by LED 1018 in a direction away from the front of the lamp 1000. Lens 1044 may be arranged to disperse, focus, collimate, color, or otherwise modify a characteristic of light 1020 passing therethrough. Alternatively, or in addition, lens 1044 may be configured as a protective shield for a module 1008, or lamp 1000. In certain cases, a collimating lens may be disposed in the space 1046 located between LED 1018 and a distal end 1048 of module 1008. Desirably, such collimating lens is placed in proximity to the discharge opening of the parabolic reflector 1022 to reduce a length of the light module 1008, in a currently preferred embodiment of lamp 1000, modules 1008 are about 2½ inches in length, and approximate the size in a thickness direction of the lamp 1000.

Figure 18:
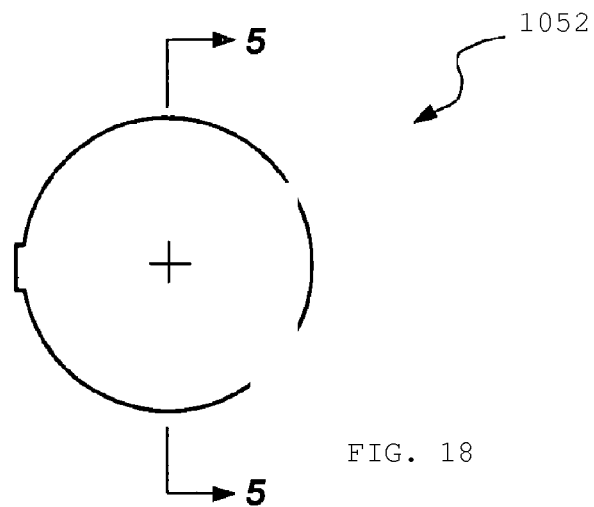
FIG. 18 is an end view of a first collimating lens used in certain embodiments of the invention.
Figure 20:
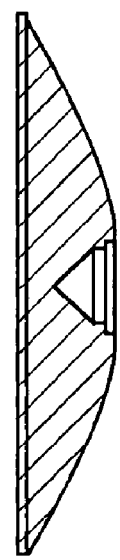
FIG. 20 is a cross-section, similar to FIG. 19, taken through a second, alternative, collimating lens.
Figure 19:
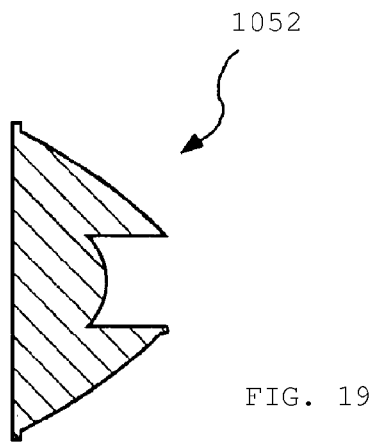
FIG. 19 is a cross-section taken through section 5-5 in FIG. 18 and looking in the direction of the arrows.

FIGS. 18-20 illustrate configurations of collimating lenses of use in certain embodiments constructed according to principles of the invention. Such lenses typically are structured to direct the LED's light output toward a target, and permit formation of lamp 1000 in a compact form factor. A pair of operable collimating lenses, configured as TIR lenses, is illustrated in FIGS. 18-20. The first collimating TIR lens 1052 (<4.5 deg. FWHM) is illustrated in end and section views in FIGS. 4 and 5, respectively. The second TIR lens (<2 deg. FWHM), illustrated in cross-section in FIG. 6 and is generally indicated at 1054. Such lenses permit a reduction in length of the stray light tube or equivalent portion of a housing 1032.

Although the foregoing description contains many specifics, these are not to be construed as limiting the scope of the present invention, but merely as providing certain representative embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention. The disclosures of any references cited herein are incorporated in their entirety to the extent not inconsistent with the teachings herein.

What is claimed is:

1. A dental examination lamp comprising:
a housing having a front adapted to be directed toward an examination area and a rear adapted to be directed away from the examination area;
at least one module at the rear of the housing comprising a plurality of tubes arranged in a generally side-by-side configuration, each tube having a first end positioned toward the rear of the housing and a second end open to the transmission of light from the interior of the tube toward the front of the lamp, with an interior surface of each tube being at least one of absorptive and generally non-reflective; and
a plurality of light emitting diodes (LEDs), each of the LEDs being arranged to direct light through one of the tubes toward the front of the lamp.

2. The lamp of claim 1, wherein the plurality of tubes are positioned with their longitudinal axes aligned to direct light toward predetermined points to form a predetermined light pattern within the examination area.

3. The lamp of claim 1, further comprising a plurality of lenses, with at least one lens per tube located at the second end thereof and adapted to direct the light from the plurality of LEDs toward the front of the lamp in pattern that casts illumination over the examination area.

4. The lamp of claim 1, further comprising a lens member at the front of the lamp presenting a plurality of individual lens sections over a face thereof arranged in a pattern corresponding to the position of the plurality of tubes, each lens section being aligned with a respective tube and adapted to direct light from that tube toward the front of the lamp in a pattern that casts illumination over the examination area.

5. The lamp of claim 1, further comprising a collimating element arranged to collimate light emanating from the at least one LED.

6. A dental examination lamp comprising:
- a housing having a front adapted to be directed toward an examination area and a rear adapted to face away from the examination area;
- a plurality of stray light tubes each having an interior surface adapted to reduce emission of stray rays outside a target footprint; and
- a plurality of light emitting diodes (LEDs), at least one LED for each stray light tube,
- wherein the plurality of tubes is arranged in a generally side-by-side configuration.

7. The lamp assembly of claim 6, wherein at least one of the stray light tubes comprises an absorptive or generally non-reflective surface.

8. The lamp assembly of claim 6, further comprising a collimating element arranged to collimate light emanating from at least one of the plurality of LEDs.

9. The lamp assembly of claim 6, wherein the plurality of stray light tubes are positioned with their longitudinal axes aligned toward predetermined points to direct the light from the plurality of LEDs toward the front of the lamp to form a predetermined light pattern within the examination area.

10. The lamp assembly of claim 6, further comprising a plurality of lenses, each located at an end of a stray light tube, the plurality of lenses adapted to direct the light from the plurality of LEDs toward the front of the lamp in a predetermined pattern that casts illumination over the examination area.

11. The lamp assembly of claim 10, wherein the plurality of tubes and the plurality of lenses form a plurality of assemblies, each assembly adapted to disperse light passing through the assembly.

12. A dental examination lamp, comprising:
- a plurality of tubes arranged in generally side-by-side configuration, each tube having a first end toward a rear of the lamp and a second end toward a front of the lamp, the second end of each tube being open to transmission of light from the interior of the tube, each tube having an optically absorptive or generally non-reflective interior surface; and
- a plurality of light emitting diodes (LEDs), each of the LEDs being arranged to direct light through one of the tubes toward the front of the lamp.

* * * * *